United States Patent
Makki et al.

(10) Patent No.: US 6,481,428 B1
(45) Date of Patent: Nov. 19, 2002

(54) METHODS AND SYSTEMS FOR REDUCING INTERNAL COMBUSTION ENGINE EXHAUST EMISSIONS

(75) Inventors: Imad Hassan Makki, Dearborn Heights, MI (US); James Michael Kerns, Trenton, MI (US); John Ottavio Michelini, Sterling Heights, MI (US); Stephen B. Smith, Livonia, MI (US); Thomas Francis Rolewicz, Jr., Dearborn, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 145 days.

(21) Appl. No.: 09/687,628

(22) Filed: Oct. 13, 2000

(51) Int. Cl.⁷ .......................... F02D 41/00; F02N 17/00
(52) U.S. Cl. ................ 123/685; 123/179.1; 123/179.21
(58) Field of Search .............................. 123/685, 179.1, 123/179.3, 179.6, 179.15, 179.21, 697

(56) References Cited

U.S. PATENT DOCUMENTS

| | | | | |
|---|---|---|---|---|
| 4,037,407 A | * | 7/1977 | Mizuno et al. ................ 60/277 |
| 4,655,182 A | | 4/1987 | Nakano et al. ........... 123/179.1 |
| 5,299,549 A | * | 4/1994 | Schatz ........................ 123/672 |
| 5,465,697 A | | 11/1995 | Hamburg et al. ...... 123/406.47 |
| 5,483,946 A | | 1/1996 | Hamburg et al. ........... 123/686 |
| 5,778,844 A | | 7/1998 | Kuttner .................... 123/179.6 |
| 5,974,785 A | | 11/1999 | Cunningham et al. ........ 60/274 |

FOREIGN PATENT DOCUMENTS

| | | | | |
|---|---|---|---|---|
| DE | 43 28 715 A1 | * | 3/1994 | ............. F01N/3/28 |
| JP | 10-306740 | * | 11/1998 | ........... F02D/41/06 |

* cited by examiner

Primary Examiner—John Kwon
Assistant Examiner—Hien T. Vo
(74) Attorney, Agent, or Firm—Randy W. Tung; Carlos L. Hanze

(57) ABSTRACT

In order to provide for reduced internal combustion engine exhaust emissions when cold starting an internal combustion engine, there is provided two methods and systems for cold starting an internal combustion engine, and one method and system for shutting down an internal combustion engine. The methods and systems are directed towards: (1) a preheating of a minimum of one thermally activated sensor within an internal combustion engine prior to cold starting of the internal combustion engine; (2) an autocranking of an internal combustion engine while metering fuel into the internal combustion engine and timing ignition within the internal combustion engine such as to reduce internal combustion exhaust emissions when cold starting the internal combustion engine; and (3) a phased shut down of fuel supply control followed by ignition source control when shutting down an internal combustion engine after operating the internal combustion engine.

6 Claims, 2 Drawing Sheets

METHODS AND SYSTEMS FOR REDUCING INTERNAL COMBUSTION ENGINE EXHAUST EMISSIONS

BACKGROUND OF THE INVENTION

1. Field of the Invention

The present invention relates generally to methods and systems for operating internal combustion engines. More particularly, the present invention relates to methods and systems for operating internal combustion engines, wherein the methods and systems reduce internal combustion engine exhaust emissions of the internal combustion engines.

2. Description of the Related Art

Common in the art of internal combustion engine design, development and manufacturing, particularly as relates to internal combustion engines that power transportation vehicles, is a continuing need to design, develop and manufacture internal combustion engines, as well as the transportation vehicles within which are assembled the internal combustion engines, such that the internal combustion engines and the transportation vehicles may be operated with reduced exhaust emissions. Reduced exhaust emissions from internal combustion engines that power transportation vehicles are desirable in the art of internal combustion engine design, development and manufacturing, as well as transportation vehicle design, development and manufacturing, insofar as such reduced exhaust emissions are often required in order to meet internal combustion engine exhaust emission regulatory requirements imposed upon both transportation vehicle manufacturers and transportation vehicle owners.

While reduced internal combustion engine exhaust emissions are thus clearly desirable in the arts of internal combustion engine design, development and manufacturing, as well as transportation vehicle design, development and manufacturing, reduced internal combustion engine exhaust emissions are nonetheless not always readily achieved within the arts of internal combustion engine design, development and manufacturing and transportation vehicle design, development and manufacturing. In that regard, reduced internal combustion engine exhaust emissions are often particularly difficult to achieve when cold starting internal combustion engines insofar as several internal combustion engine exhaust emission control components, such as in particular catalytic converters, are often not fully operational when cold starting internal combustion engines.

It is thus desirable in the art of internal combustion engine design, development and manufacturing, as well as transportation vehicle design, development and manufacturing, to provide methods and systems for operation of internal combustion engines, such as to provide reduced internal combustion engine exhaust emissions, particularly hydrocarbon emissions, upon cold starting of internal combustion engines.

It is towards the foregoing object that the present invention is directed.

Various methods and systems for operation of internal combustion engines have been disclosed within the art of internal combustion engine design, development and manufacturing, as well as transportation vehicle design, development and manufacturing, for providing internal combustion engines, as well as transportation vehicles, with desirable features, such as but not limited to reduced internal combustion engine exhaust emissions. Included within such disclosed methods and systems are: (1) Nakano et al., U.S. Pat. No. 4,655,182 (method and system for maximizing oxygen sensor heating after cold starting an internal combustion engine for enhanced internal combustion engine performance and reduced internal combustion engine exhaust emissions); (2) Hamburg et al., U.S. Pat. Nos. 5,465,697 and 5,483,946 and Cunningham et al., U.S. Pat. No. 5,974,785 (method and system for maximizing catalytic converter heating after cold starting of an internal combustion engine by controlling an air/fuel ratio within the internal combustion engine); and (3) Kuttner, U.S. Pat. No. 5,778,844 (method and system for preheating a heating element within an internal combustion engine, such as in particular a glow plug within a diesel internal combustion engine, such as to provide reduced battery drain within an ignition system associated with the internal combustion engine).

Desirable in the art of internal combustion engine design, development and manufacturing, as well as transportation vehicle design, development and manufacturing, are additional methods and systems for operation of internal combustion engines such as to provide reduced internal combustion engine exhaust emissions, particularly hydrocarbon emissions, upon cold starting of internal combustion engines.

It is towards the foregoing object that the present invention is directed.

SUMMARY OF THE INVENTION

In accord with the object towards which the present invention is directed, there is provided by the present invention two methods and systems for cold starting an internal combustion engine, and one method and system for shutting down an internal combustion engine, wherein all three methods and systems reduce internal combustion exhaust emissions of an internal combustion engine, particularly upon cold starting of the internal combustion engine. The methods and systems are directed towards: (1) a preheating of at least one thermally activated sensor within an internal combustion engine prior to cold starting of the internal combustion engine; (2) an autocranking of an internal combustion engine while metering fuel into the internal combustion engine and timing ignition within the internal combustion engine such as to reduce internal combustion engine exhaust emissions when cold starting the internal combustion engine; and (3) a phased shut down of fuel supply control followed by ignition source control when shutting down an internal combustion engine after operating the internal combustion engine.

Each of the foregoing methods and systems provides for reduced internal combustion engine exhaust emissions, in particular when cold starting an internal combustion engine.

BRIEF DESCRIPTION OF THE DRAWINGS

The objects, features and advantages of the present invention are understood within the context of the Description of the Preferred Embodiments, as set forth below. The Description of the Preferred Embodiments is understood within the context of the accompanying drawings, which form a material part of this disclosure, wherein.

DESCRIPTION OF THE PREFERRED EMBODIMENTS

There is provided by the present invention two methods and systems for cold starting an internal combustion engine, and one method and system for shutting down an internal combustion engine, such as to reduce internal combustion exhaust emissions from an internal combustion engine, particularly hydrocarbon emissions, upon cold starting of the internal combustion engine. The methods and systems are directed towards: (1) a preheating of at. least one thermally activated sensor within an internal combustion engine combustion engine prior to cold starting of the internal combustion engine; (2) an autocranking of an internal combustion engine while metering fuel into the internal combustion engine and timing ignition within the internal combustion engine such as to reduce internal combustion engine exhaust emissions when cold starting the internal combustion engine; and (3) a phased shut down of fuel supply control followed by ignition source control when shutting down an internal combustion engine after operating the internal combustion engine.

Each of the foregoing methods and systems provides for reduced internal combustion engine exhaust emissions, in particular hydrocarbon emissions, when cold starting an internal combustion engine.

The methods and systems of the present invention may be employed for operating internal combustion engines including but not limited to gasoline fueled internal combustion engines, gasoline blend fueled internal combustion engines, diesel fueled internal combustion engines, diesel blend fueled internal combustion engines, reciprocating piston internal combustion engines and rotary piston internal combustion engines, as employed within applications including but not limited to stationary applications and mobile applications, such mobile applications including but not limited to marine transportation applications, aeronautic transportation applications and terrestrial transportation applications. With respect to terrestrial transportation applications, the present invention may be employed within internal combustion engines employed for powering transportation vehicles including but not limited to passenger transportation vehicles, sport utility transportation vehicles, light utility transportation vehicles and heavy utility transportation vehicles.

Figure 1:
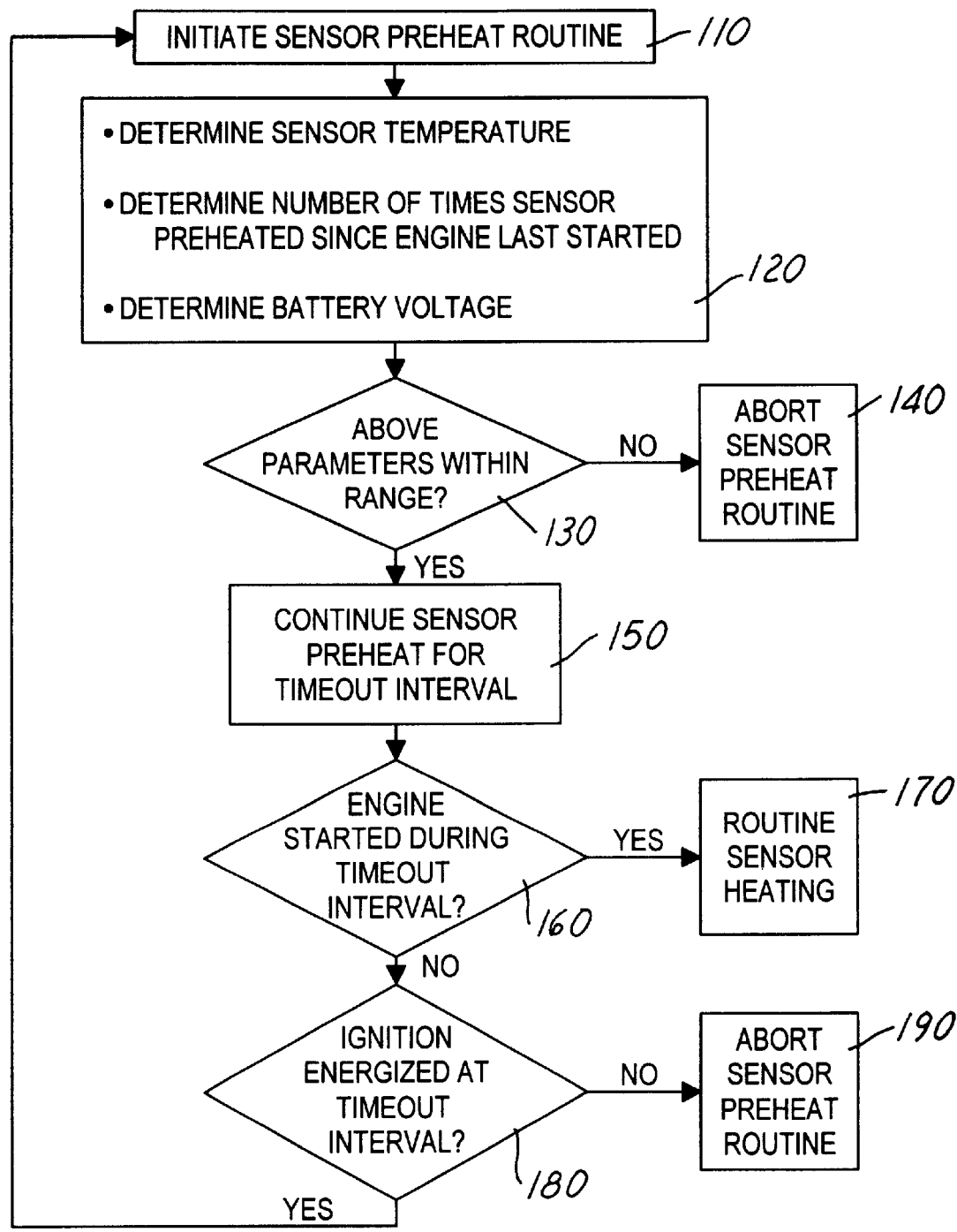
FIG. 1, FIG. 2 and FIG. 3 show a series of schematic block flow diagrams illustrating three preferred embodiments of methods and systems for operating an internal combustion engine in accord with the present invention.
Figure 2:
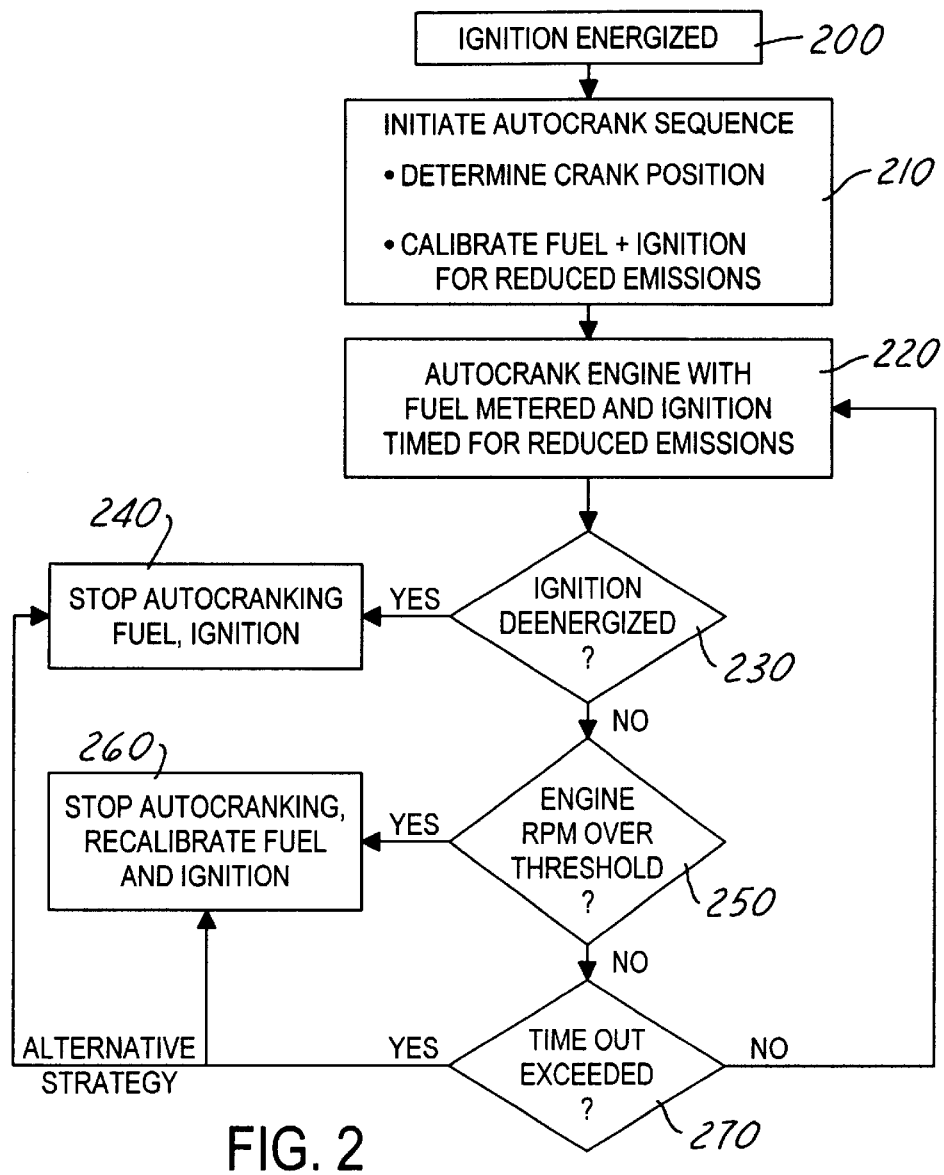
Figure 3:
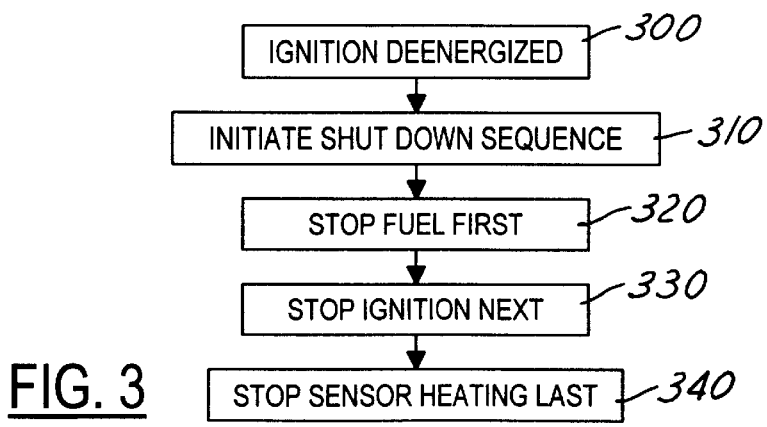

Referring now to FIG. 1 to FIG. 3, there is shown a series of three schematic block flow diagrams illustrating a series of three process flows in accord with three preferred embodiments of the present invention.

Shown within FIG. 1 is a schematic block flow diagram illustrating a process flow in accord with a first preferred embodiment of the present invention.

Shown within FIG. 1, and in accord with the block which corresponds with reference numeral 110, there is first initiated prior to starting an internal combustion engine a sensor preheat routine, where within the first preferred embodiment of the present invention the sensor preheat routine is intended as directed towards a thermally activated internal combustion engine sensor selected from the group including but not limited to thermally activated mass air flow (MAF) internal combustion engine sensors, thermally activated unheated exhaust gas oxygen (UEGO) internal combustion engine sensors and thermally activated heated exhaust gas oxygen (HEGO) internal combustion engine sensors that are typically located, as appropriate, within internal combustion engine air intake systems and internal combustion engine exhaust systems.

Within the first preferred embodiment of the present invention with respect to a triggering event that may be employed for initiating the thermally activated sensor preheat routine prior to starting the internal combustion engine, the triggering event is at least one triggering event selected from the group including but not limited to a transportation vehicle door sensor triggering event, a transportation vehicle seat sensor triggering event, a transportation vehicle anti-theft device sensor (ablement/disablement) triggering event, a transportation vehicle ignition system sensor (typically key insertion sensor) triggering event or a combination thereof. Typically and preferably, the transportation vehicle door sensor triggering event and the transportation vehicle ignition system key insertion sensor triggering event are not employed as a sole triggering event or in combination as a binary triggering event, since the former is ambiguous as a triggering event and the later typically has a limited lead time as a triggering event.

Upon initiating of the thermally activated sensor preheat routine in accord with the first preferred embodiment of the present invention, and further in accord with the blocks that correspond with reference numerals 120 and 130, there is then determined values for various parameters that relate to operation of the thermally activated sensor in accord with the first preferred embodiment of the present invention. The parameters include, but are not limited to: (1) a thermally activated sensor temperature (which when "cold" is typically and preferably within a range of less than about 80 degrees centigrade and more preferably within a range of from about −10 to about 35 degrees centigrade); (2) a number of times the thermally activated sensor has been preheated since the internal combustion engine was last started (which is typically and preferably with a range of no greater than about 10 times); and (3) a battery voltage for a battery that supplies power to preheat the thermally activated sensor (which is typically and preferably with a range of from about 9 to about 13 volts, for a nominal 12 volt battery). The thermally activated sensor preheat routine in accord with the first preferred embodiment of the present invention may also involve determination of ambient conditions and may also be monitored within a transportation vehicle by means of an indicator light.

Further in accord with the decisional block that corresponds with reference numeral 130, if the above parameters are not within their preferred ranges, and in accord with the block that corresponds with reference numeral 140, the thermally activated sensor preheat routine is aborted. Similarly, and also in accord with the decisional block that corresponds with reference numeral 130, if the above parameters are within their preferred ranges, and in accord with the block that corresponds with reference numeral 150, the thermally activated sensor preheat routine is continued for a prescribed timeout interval. Typically and preferably, the prescribed timeout interval is from about 5 to about 25 seconds.

Referring again to FIG. 1, and in accord with the decisional block that corresponds with reference numeral 160, a determination is made as to whether the internal combustion engine has started during the timeout interval. If the internal combustion engine has started during the timeout interval, and in accord with the block that corresponds with reference numeral 170, thermally activated sensor heating and internal combustion engine operation are continued within the context routine sensor heating subsequent to the internal combustion engine starting. If the internal combustion engine has not started during the timeout interval, and in accord with an additional inquiry block that corresponds with reference numeral 180, an inquiry is made as to whether the internal combustion ignition has been energized at or prior to ending of the timeout interval. Such energizing of the ignition is typically and preferably, but not exclusively, effected by inserting an ignition key into an ignition switch. If the ignition has been energized, the process of the first preferred embodiment of the present invention loops back to the block that corresponds with reference numeral 110 and repeats the intervening process steps. If the ignition has not been energized, and in accord with the block that corresponds with reference numeral 190, the thermally activated sensor preheat routine is aborted.

As is understood by a person skilled in the art, the first preferred embodiment of the present invention provides reduced internal combustion exhaust emissions when starting an internal combustion engine, since if a thermally activated sensor is adequately preheated an internal combustion engine having the adequately preheated thermally activated sensor assembled therein may more rapidly be operated under a closed loop control (in particular as related to air/fuel metering and ignition timing) while employing the adequately preheated thermally activated sensor as a control element.

As is further understood by a person skilled in the art, while the schematic block flow diagram of FIG. 1 discloses in general a method in accord with the first preferred embodiment of the present invention, the method in accord with the first preferred embodiment of the present invention also contemplates an internal combustion engine system in accord with the method, where the internal combustion engine system comprises: (1) an internal combustion engine; (2) a minimum of one thermally activated sensor; (3) a minimum of one trigger means (for effecting a sensor preheat routine) ; and (4) an engine controller, which may be employed to effect the method in accord with the first preferred embodiment of the present invention.

Referring now to FIG. 2, there is shown a schematic block flow diagram illustrating a second preferred embodiment for operating an internal combustion engine in accord with the present invention. Analogously with the first preferred embodiment of the present invention, the second preferred embodiment of the present invention is also directed towards a method for cold starting the internal combustion engine.

As is illustrated within FIG. 2, and in accord with the block which corresponds with reference numeral 200, there is first energized an ignition for an internal combustion engine. The ignition for the internal combustion engine may be energized employing methods as are conventional in the art of internal combustion engine design, development and manufacturing, including but not limited to inserting a key into an ignition switch within a starter circuit for the internal combustion engine, as well as remotely energizing an ignition system for an internal combustion engine while employing a remote activation transmitter.

Referring again to FIG. 2, and in accord with the block which corresponds with reference numeral 210, there is then initiated an autocrank sequence within the internal combustion engine. As is similarly also illustrated within the block which corresponds with reference numeral 210, the autocrank sequence comprises at least in part: (1) determining a crank angle of a crankshaft within the internal combustion engine; and (2) calibrating a fuel metering and an ignition timing for reduced exhaust emissions when cold starting the internal combustion engine. Similarly, although not specifically illustrated within the schematic block flow diagram of FIG. 2, the initiation of the autocrank sequence will typically and preferably also include a determination of an internal combustion engine temperature (typically and preferably coolant temperature) such as to determine whether the internal combustion engine is "cold" (i.e., as above, having a temperature of less than about 80 degrees centigrade).

Nest, and in accord with the block which corresponds with reference numeral 220, there is then autocranked the internal combustion engine with the fuel metered and ignition timed for reduced internal combustion exhaust emissions. Such a fuel metering and ignition timing calibrated for reduced internal combustion engine exhaust emissions will typically and preferably not correspond, for example and without limitation with a fuel metering and an ignition timing calibrated for an optimal catalytic converter autoheating within the internal combustion engine (which in comparison has a particularly lean air/fuel ratio) or with a fuel metering and an ignition timing calibrated for optimal "hot" (i.e., coolant temperature of greater than about 80 degrees centigrade) operation of the internal combustion engine (which in comparison has a generally richer air/fuel ratio).

Referring again to the FIG. 2, and in accord with the decisional block that corresponds with reference numeral 230 a determination is made during autocranking whether the ignition has been deenergized. If the ignition has been deenergized, and in accord with the block that corresponds with reference numeral 240, engine autocranking, fuel and ignition are terminated. If the ignition has not been deenergized, and in accord with a further decisional block that corresponds with reference numeral 250, a determination is made as to whether the internal combustion engine revolutions per minute (rpm) are over a threshold value, typically from about 200 to about 500 revolutions per minute (rpm) , at which the internal combustion engine is deemed to have started. If the internal combustion engine is deemed to have started, and in accord with the block that corresponds with reference numeral 260, the engine autocranking is stopped and the fuel metering and ignition timing are recalibrated, as needed, to accommodate further operation of the internal combustion engine, such as but not limited to warm up a catalytic converter associated with the internal combustion engine or to provide an optimal "hot" operation of the internal combustion engine. If the internal combustion engine has not started, and in accord with a decisional block that corresponds with reference numeral 270, a determination is made whether a timeout interval for autocranking of the internal combustion engine has been exceeded. If the timeout interval for autocranking has not been exceeded, autocranking is continued in accord with a loop that starts with the block that corresponds with reference numeral 220. Similarly, if the timeout interval for autocranking has been exceeded, autocranking is terminated in accord with either the block that corresponds with reference numeral 240 or the block that corresponds with reference numeral 260.

While, similarly with the first preferred embodiment of the present invention, the schematic block flow diagram of FIG. 2 discloses in general a method in accord with the second preferred embodiment of the present invention, the method in accord with the second preferred embodiment of the present invention also contemplates an internal combustion system in accord with the method, where the internal combustion system comprises: (1) an internal combustion engine; (2) an autocrank assembly assembled to the internal combustion engine; and (3) an engine controller, which may be employed to effect the method in accord with the second preferred embodiment of the present invention.

Similarly, the second preferred embodiment of the present invention provides reduced exhaust emissions for an internal combustion engine operated in accord with the second preferred embodiment of the present invention since the autocranking of the internal combustion engine provides for uniform starting operation of the internal combustion engine during cold starting of the internal combustion engine.

Referring now to FIG. 3, there is shown a schematic block flow diagram illustrating a sequence of process steps in accord with a third preferred embodiment of the present invention. In contrast with the first preferred embodiment of the present invention and the second preferred embodiment of the present invention, which are directed towards methods and systems for operating an internal combustion engine when cold starting the internal combustion engine, in order to provide reduced internal combustion engine exhaust emissions when cold starting the internal combustion engine, the third preferred embodiment of the present invention is directed towards a method and a system for operating an internal combustion engine when shutting down the internal combustion engine, such as to provide for reduced internal combustion engine exhaust emissions when subsequently restarting the internal combustion engine, and in particular when subsequently cold restarting the internal combustion engine.

As is illustrated within FIG. 3, and in accord with the block that corresponds with reference numeral 300, there is first deenergized when shutting down an internal combustion engine an ignition of the internal combustion engine.

Referring again to FIG. 3, and in accord with the block that corresponds with reference numeral 310, there is then initiated a shut down sequence of the internal combustion engine.

Referring yet again to FIG. 3, and in accord with the third preferred embodiment of the present invention, and as is further illustrated within the blocks that corresponds with reference numeral 320, reference numeral 330 and reference numeral 340, with further respect to a specific shut down sequence for the internal combustion engine: (1) there is first stopped a fuel supply to the internal combustion engine; (2) there is next stopped an ignition source to the internal combustion engine; and (3) there is finally stopped a thermally activated sensor heating within the internal combustion engine.

By employing within the context of the third preferred embodiment of the present invention the shut down sequence where there is first stopped a fuel supply to an internal combustion engine, then an ignition source to the internal combustion engine and finally a thermally activated sensor heating within the internal combustion engine, the internal combustion engine is shut down in a fashion such as to provide reduced exhaust gas emissions when restarting (particularly when cold restarting) the internal combustion engine, insofar as there will be reduced residual hydrocarbon vapors within the internal combustion engine when restarting (particularly when cold) the internal combustion engine.

In accord with the first preferred embodiment of the present invention and the second preferred embodiment of the present invention, while the schematic block flow diagram of FIG. 3 discloses in general a method in accord with the third preferred embodiment of the present invention, the method in accord with the third preferred embodiment of the present invention also contemplates an internal combustion engine system in accord with the method, where the internal combustion engine system comprises in part: (1) an internal combustion engine; (2) a fuel supply control; (3) an ignition source control; and (4) an engine controller, which may be employed to effect the method in accord with the third preferred embodiment of the present invention.

Upon operating an internal combustion engine in accord with any of the three foregoing preferred embodiments of the present invention, the internal combustion engine is operated in a fashion such as to provide the internal combustion engine with reduced exhaust emissions, particularly hydrocarbon emissions, upon cold starting the internal combustion engine.

As is understood by a person skilled in the art, the preferred embodiments of the present invention are illustrative of the present invention rather than limiting of the present invention. Revisions and modifications may be made to methods, components, assemblies, controllers and systems in accord with the preferred embodiments of the present invention while still providing methods and systems in accord with the present invention, further in accord with the accompanying claims.

What is claimed is:

1. A system for starting an internal combustion engine comprising:

an internal combustion engine comprising a minimum of one thermally activated sensor;

a minimum of one triggering means selected from the group consisting of a seat switch triggering means and an anti-theft device triggering means; and an engine controller programmed to thermally activate the thermally activated sensor for a prescribed time interval upon a minimum of one triggering event monitored by the minimum of one triggering means.

2. The system of claim 1 wherein the thermally activated sensor is selected from the group consisting of thermally activated mass air flow sensors and thermally activated exhaust gas oxygen sensors.

3. The system of claim 1 wherein the engine controller is programmed to thermally activate the thermally activated sensor for the prescribed time interval upon a minimum of two triggering events at least one of which is monitored by the minimum of one triggering means.

4. A method for starting an internal combustion engine comprising:

providing an internal combustion engine comprising a minimum of one thermally activated sensor; and preheating the minimum of one thermally activated sensor prior starting the internal combustion engine, the preheating of the minimum of one thermally activated sensor being triggered by a minimum of one triggering event selected from the group consisting of a door sensor triggering event, a seat sensor triggering event, an anti-theft device sensor triggering event and an ignition system sensor triggering event, but not the door sensor triggering event or an ignition key insertion sensor triggering event either alone or as a binary combination.

5. The method of claim 4 wherein the thermally activated sensor is selected from the group consisting of thermally activated mass air flow sensors and thermally activated exhaust gas oxygen sensors.

6. The method of claim 4 wherein the triggering of the preheating of the minimum of one thermally activated sensor is triggered by a binary combination of the seat sensor triggering event and the anti-theft device sensor triggering event.

* * * * *